Jan. 30, 1968     H. J. DONALD     3,365,750
EXTRUSION DIE
Filed July 11, 1966
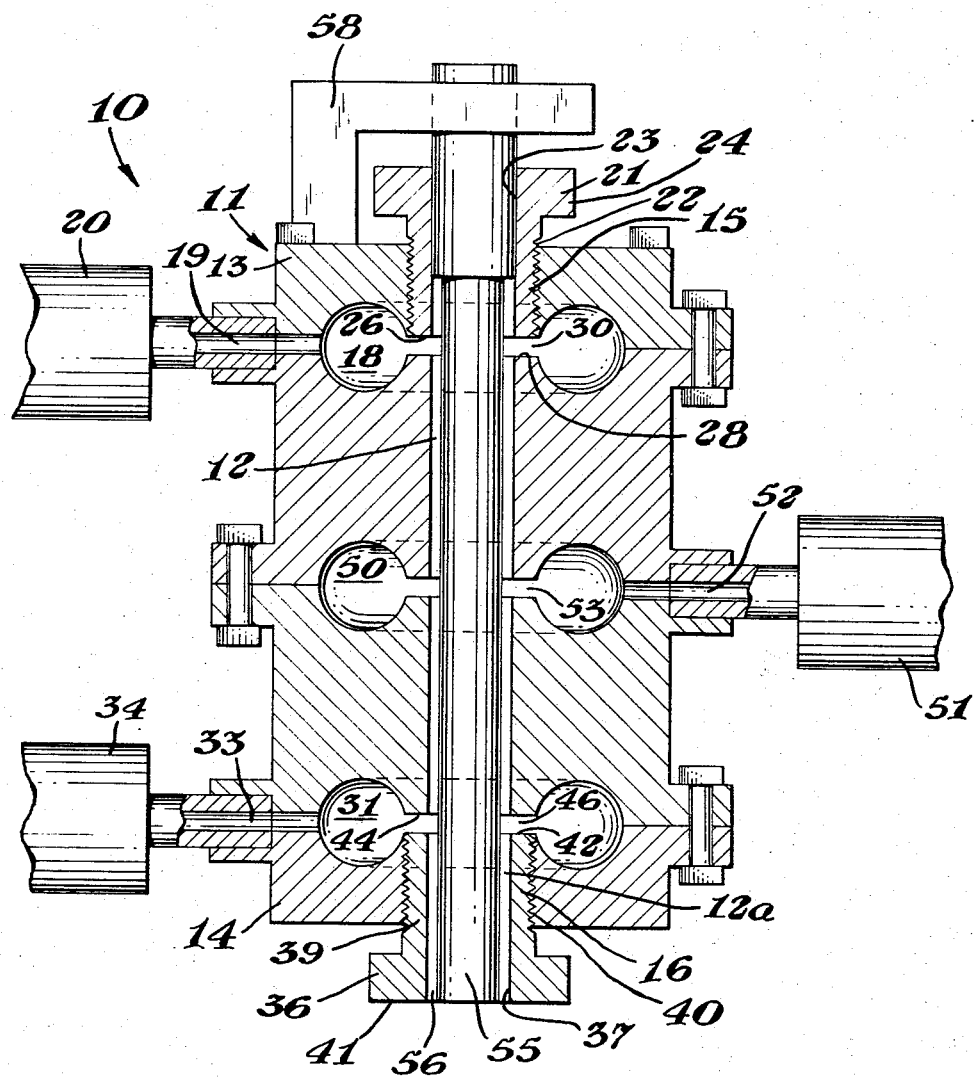
INVENTOR.
Harold Jack Donald
BY
Robert B. Ingraham
AGENT

United States Patent Office 3,365,750
Patented Jan. 30, 1968

3,365,750
EXTRUSION DIE
Harold Jack Donald, Midland, Mich., assignor to The Dow Chemical Company, Midland, Mich., a corporation of Delaware
Filed July 11, 1966, Ser. No. 564,398
6 Claims. (Cl. 18—13)

This invention relates to an improved extrusion die, and more particularly to an improved extrusion die adapted to extrude a tubular article.

Extrusion dies are known which extrude a plurality of coaxially arranged layers on a substrate such as a pipe. Such coaxial dies beneficially comprise a central passageway having a plurality of annular plenums disposed within a housing, each of the plenums having one annular extrusion orifice leading to the central passageway. Such dies oftentimes present difficulty during operation particularly when a variety of products are to be obtained therefrom and the thickness of the various coaxial layers are to be varied. Oftentimes, it is necessary to disassemble such a die and insert or remove shims in order to vary the width of the annular inwardly facing extrusion orifice or to add plate-like elements having different dimensions.

It would be advantageous if there were available a die suited for multiple coaxial extrusion having readily adjustable annular extrusion passageways.

It would also be advantageous if such a die were relatively simple in construction.

It would also be beneficial if such a die could be adjusted during extrusion operation.

These benefits and other advantages in accordance with the present invention are achieved in an extrusion die, the die comprising a housing; the housing defining a centrally located generally cylindrical extrusion passage; the housing defining at least a first annular plenum and a second annular plenum; the first annular plenum being in communication with means to supply an extrudable material to the plenum; a first annular passageway providing full communication between the first annular plenum and the extrusion passageway; a second annular plenum disposed about the central passageway; a second annular passageway providing full communication between the second annular plenum and the extrusion passageway; means to supply an extrudable material to the second annular plenum, the improvement which comprises the first and second annular passageways each being defined by the housing and an adjustable hollow cylindrical bushing adjustably secured to the housing and positionable from a location external to the housing.

Further features and advantages of the present invention will become more apparent from the following specification when taken in connection with the drawing wherein:

The figure depicts a schematic representation of one embodiment of a die in accordance with the present invention.

In the figure, there is illustrated a die generally designated by the reference numeral 10. The die 10 comprises a housing 11. The housing 11 defines an internal passageway 12 of a generally cylindrical configuration extending from a first end 13 to a second end 14 of the housing. Adjacent the first end 13 of the housing 11 the passageway 12 is enlarged and has an internally threaded portion 15. A similar enlarged and internally threaded portion 16 is disposed adjacent the second end 14 of the housing 11. The housing 11 defines a first internal annular plenum 18. The plenum 18 is disposed in a generally coaxial relationship with respect to the internal or extrusion passageway 12. The plenum 18 is in communication with an extrude supply means or passage 19 adapted to receive an extrudable material. A portion 20 of a screw extruder is in operative communication with the passageway 19. A sleeve or bushing 21 is disposed within the enlarged and internally threaded portion 15 of the passageway 12. The bushing 21 has external threads 22 which are in operative engagement with the threads of the housing. The bushing 21 defines a centrally disposed opening 23 which is substantially coaxial with the extrusion passageway 12. The bushing 21 has an operating or rotating means 24 which is adapted to be grasped by a suitable rotating tool such as a wrench. The rotating means is disposed external to the housing 11. The bushing 21 has a terminal face 26 disposed within the housing 11. A generally annular face 28 is defined by the housing. The faces 28 and 26 extend generally radially outward from the extrusion passageway 12 and define an annular extrusion orifice 30 which provides full communication between the plenum 18 and the extrusion passageway 12. A second plenum 31 is defined within the housing 11. The plenum 31 is in operative communication with an extrude passage or supply means 33. The passage 33 is in operative communication with the screw extruder 34. A bushing 36 is disposed within the enlarged and threaded portion 16 of the passageway 12. The bushing 36 defines an internal cylindrical passage 37 which is coaxially disposed relative to the extrusion passageway 12. The bushing 36 comprises a body portion 39 defining a plurality of external threads 40 which are in operative engagement with the internal threads of the portion 16 of the passageway 12. The bushing 36 has an external operating means 41 adapted to be grasped and rotated by means of a wrench or like rotating device. The bushing 36 has a terminal face 42 disposed within the housing 11 generally adjacent the plenum 31. The face 42 generally lies in a plane normal to the axis of the passageway 12. The housing 11 defines an annular face 44 generally adjacent the face 42. The faces 42 and 44 define an internally disposed annular passageway 46 which provides full communication between the passageway 12 and the plenum 31. The housing 11 defines a third internal plenum 50. The plenum 50 is in operative communication with an extruder 51 by means of a third supply means or passage 52 defined by the housing 11. The housing 11 defines an annular passageway 53 which provides communication between the plenum 50 and the extrusion passageway 12. A mandrel 55 is disposed within the passageway 12. The mandrel 55 has a cylindrical configuration. The mandrel 55 and the housing 11 define an internal annular extrusion passageway 12a which terminates adjacent the second end 14 of the housing 11 in an annular extrusion orifice 56. The passageway 12a extends at least from the annular extrusion passage 30 to the extrusion orifice 56. The mandrel 55 remote from the extrusion orifice 56 forms a sliding fit within the passageway 23 of the bushing 21. A mandrel support 58 secures the mandrel in fixed relationship to the housing 11.

In operation of the die of the present invention, extrudable material such as synthetic thermoplastic resins are supplied to the first, second and third annular plenums from extruders at a desired rate, thereby extruding from the orifice 56 a three layer tube having coaxially arranged layers. The desired back pressure on the extruders 20 and 34 is obtained by rotating the bushings 21 and 36 in order to open or restrict the passages 30 and 46, respectively, and provide the desired back pressure.

Employing the apparatus of the present invention, it is found that relatively thin layers are readily extruded onto the inner and outer surfaces of a tube with a high degree of uniformity wherein the width of the passages 30 and 46 is relatively narrow. The extrusion conditions are readily altered while operating to extrude thick layers by rotating the bushings 21 and 36 to widen the passages 30 and 46.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:
1. In an extrusion die, the die comprising
a housing, the housing defining
a centrally located generally cylindrical extrusion passageway, the housing defining at least
a first annular plenum and
a second annular plenum being in communication with means to supply an extrudable material to the plenum,
a first annular passageway providing circular communication between a first annular plenum and the extrusion passageway,
the second annular plenum disposed about the central passageway,
a second annular passageway providing full communication between the second annular plenum and the extrusion passageway,
means to supply an extrudable material to the second annular plenum,
the improvement which comprises the first and second annular passageways each being defined by the housing and an adjustable hollow cylindrical bushing adjustably secured to the housing and positionable from a location external to the housing.

2. The apparatus of claim 1 including a mandrel disposed within the extrusion passage and in combination with the housing defining an annular extrusion passage.

3. The apparatus of claim 1 including a third annular plenum in communication with a third extrudable material supply means having a third annular passage communicating with the extrusion passage, the third annular passage being defined by the housing.

4. The die of claim 1 wherein the bushings threadably engage the extrusion housing whereby the width of the first and second annular passageways is varied by rotating the bushings.

5. The apparatus of claim 2 wherein the mandrel is rigidly secured to the housing.

6. The apparatus of claim 5 wherein one of the bushings in combination with the mandrel defines an annular extrusion orifice.

References Cited

UNITED STATES PATENTS

| | | | |
|---|---|---|---|
| 2,501,690 | 3/1950 | Prendergast | 18—13 |
| 3,222,721 | 12/1965 | Reynolds | 18—13 |
| 3,308,508 | 3/1967 | Schrenk | 18—13 |
| 3,321,803 | 5/1967 | Corbett | 18—13 |
| 3,327,349 | 6/1967 | Lennox | 18—13 |

WILLIAM J. STEPHENSON, *Primary Examiner.*